United States Patent [19]
Takahashi

[11] Patent Number: 5,705,256
[45] Date of Patent: Jan. 6, 1998

[54] METHOD FOR FABRICATING OPTICAL QUALITY MOLDS WITH PRECISION MICROFEATURES

[75] Inventor: Ken Matthew Takahashi, Warren, N.J.

[73] Assignee: Lucent Technologies, Inc., Murray Hill, N.J.

[21] Appl. No.: 553,116

[22] Filed: Nov. 7, 1995

Related U.S. Application Data

[62] Division of Ser. No. 348,423, Dec. 2, 1994, Pat. No. 5,575,962.

[51] Int. Cl.⁶ .................................................... B32B 3/00
[52] U.S. Cl. .................. 428/195; 428/192; 428/304.4; 428/315.5; 428/332; 428/336; 428/411.1
[58] Field of Search ............................ 264/580; 428/193, 428/411.1, 131, 174, 192, 212, 218, 304.4, 315.5, 925, 195, 332, 336

[56] References Cited

U.S. PATENT DOCUMENTS

| | | |
|---|---|---|
| 4,144,300 | 3/1979 | Breeden . |
| 4,325,779 | 4/1982 | Rossetti . |
| 4,832,790 | 5/1989 | Rossetti . |
| 5,007,984 | 4/1991 | Tsutsumi et al. . |
| 5,013,494 | 5/1991 | Kubo et al. . |
| 5,071,597 | 12/1991 | D'Amato et al. . |
| 5,108,814 | 4/1992 | Harp et al. ............................ 428/156 |
| 5,245,454 | 9/1993 | Blonder . |
| 5,288,591 | 2/1994 | Blonder . |
| 5,298,117 | 3/1994 | Hanson et al. . |
| 5,348,616 | 9/1994 | Hartman et al. . |
| 5,389,313 | 2/1995 | Imataki et al. . |

*Primary Examiner*—William Krynski

[57] ABSTRACT

Optical quality molds and mold inserts include an optically flat substrate, a layer of material applied to the substrate and one or more depressions in a predetermined pattern formed in the layer of material applied to the substrate. The depth of the depressions are precisely determined by the thickness of the layer applied to the substrate. By contacting the mold with resin in a fluid state, a component is fabricated having microfeatures formed monolithically thereon.

17 Claims, 4 Drawing Sheets

METHOD FOR FABRICATING OPTICAL QUALITY MOLDS WITH PRECISION MICROFEATURES

This is a divisional of application Ser. No. 08/348,423 filed Dec. 2, 1994, now U.S. Pat. No. 5,575,692.

TECHNICAL FIELD

This disclosure relates to optical quality molds and mold inserts for imparting precision microfeatures to molded polymeric articles, methods for making such molds and polymeric articles made using such molds.

BACKGROUND

Polymeric materials, especially thermoplastics, have several potential advantages over glass for use in electronic devices, such as substrates in flat panel displays. Generally, plastics are lighter and more mechanically robust than glass. Additionally, plastic processing, especially of continuous films or sheets, allows low-cost production of parts.

Plastics can be made nonplanar by molding or embossing. However, the dimensional constraints for display and other electronic applications exceed standard mold making technology. For example, display panels must be optically flat, and many of the desirable features are only several microns in size. It would be desirable to have a process for making optical quality mold inserts with precision microfeatures for the production of molded polymeric articles having precision microfeatures.

SUMMARY

A mold or mold insert is provided for imparting precision microfeatures to molded polymeric articles such as, for example, polymeric flat panel displays. To form the surface of the mold, an etchable layer is deposited onto an optically flat substrate. The etchable layer is masked using known photolithographic techniques. Etching is then performed to provide a desired pattern of depressions in the etchable layer and the masking material is stripped. The mold insert is placed into a mold cavity and a molten or uncured polymeric material is introduced into contact with the mold to produce a polymeric article having desired microfeatures.

In a particularly useful embodiment, first and second etchable layers are applied to an optically flat surface, the second etchable layer being made from a material which etches faster than the first etchable layer. Masking of the second etchable layer is accomplished using known photolithographic techniques. Upon etching, the differential in etching rates provides a desired pattern of depressions having tapered side walls. After stripping the masking material, the mold insert is placed into a mold and a molten or uncured polymeric material is introduced into contact with the mold to produce a polymeric article having desired microfeatures.

In another aspect, components for electronic devices are made from polymeric resins in accordance with this disclosure. The components have microfeatures formed monolithically thereon. In a particularly preferred embodiment, the component is a flat panel display.

DETAILED DESCRIPTION OF PREFERRED EMBODIMENTS

Figure 1:
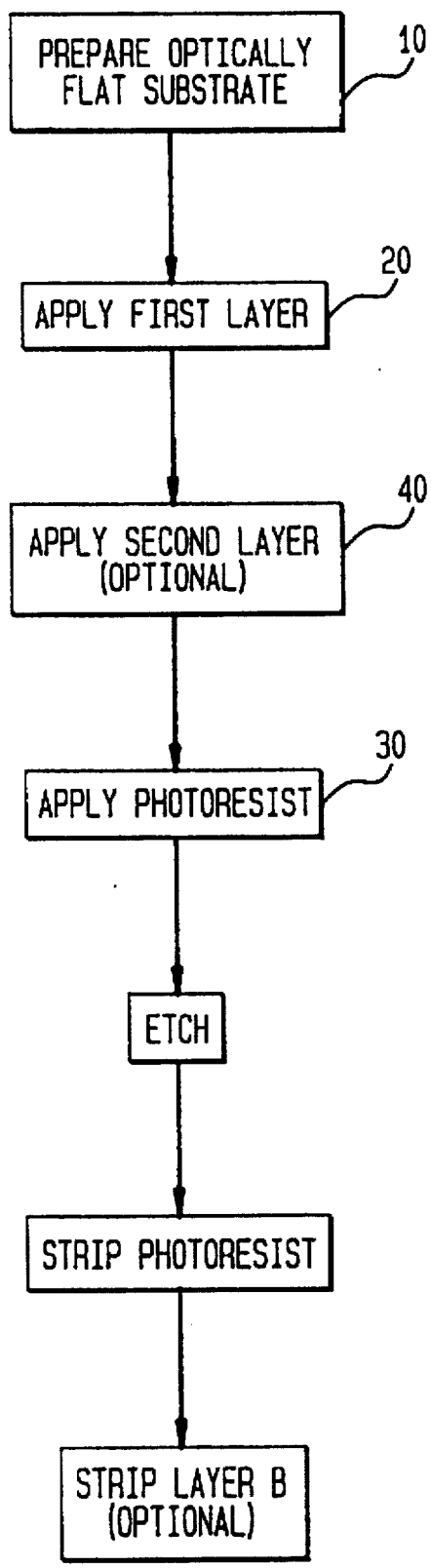
FIG. 1 is a block diagram showing the steps for making a mold insert in accordance with this disclosure.

Molded polymeric articles having desired microfeatures are produced in accordance with this disclosure. The microfeatures are imparted to the polymeric article by a mold or mold insert prepared in accordance with the process summarized in FIG. 1. Specifically, an optically flat substrate 10 is prepared. Substrate 10 can be prepared by depositing a suitable material onto optically flat surface, thereby replicating the optically flat surface. For example, material can be deposited onto optically flat glass surfaces or onto other materials (e.g., anodized nickel) on which an optically flat surface has been formed (e.g., by lapping, polishing or machining). Substrate 10 is made from any material that can adequately reproduce the optically flat surface. Metals are particularly useful materials for forming the substrate. Suitable metals include nickel, copper, chromium, aluminum, brass and gold. The substrate material can be applied to the optically flat surface to be replicated using any known technique. For example, where a metal is used on the substrate material it can be electroformed or deposited using a vacuum deposition technique. The substrate material is applied to a thickness sufficient to maintain mechanical integrity of the substrate upon removal from the optically flat surface being replicated. Where nickel is deposited on glass, a thickness of about 2 mils or greater is sufficient. A thickness of 5 to 25 rail is preferred. A release layer can be applied to the optically flat substrate being replicated prior to formation of the substrate to facilitate removal of the substrate from the glass.

Once formed, the substrate can be peeled from the glass or other optically flat surface or released therefrom via chemical treatment. It is also contemplated that removal of the substrate from the glass is not necessary where the upper, deposition surface of the substrate material adequately reproduces the optically flat surface of the glass.

A layer of etchable material 20 is then deposited on substrate 10. Layer 20 can be made from any etchable material that will adhere to the substrate, can be deposited with precisely controlled thickness and can withstand the temperature involved in molding polymers. Metals are particularly useful. Suitable metals include copper, chromium, aluminum, titanium and molybdenum. Layer 20 can be applied using known techniques such as, for example, vacuum deposition, electroplating and electroless deposition. Where electroless deposition is employed a seed layer, e.g., stannous chloride or palladium chloride, may be used to facilitate growth of layer 20. In other situations, a thin (0.5 µm) adhesion layer of chromium can be applied, e.g., sputtered, to a nickel substrate to facilitate deposition of a copper layer onto substrate. The thickness of layer 20 will be that of the dimension of the microfeature to be formed in the display. Typically, layer 20 will be from about 0.1 µm liter to about 50 µm or greater. Preferably layer 20 will be from about 1 µm to 10 m.

A masking layer 30 is then applied to layer 20 using known photolithographic techniques. Masking layer 30 is applied in a predetermined pattern to provide one or more exposed portions 22 of layer 20 in appropriate locations and areas where microfeatures are desired on the polymeric article. Each exposed portion 22 of layer 20 will, upon etching as disclosed hereinbelow, will produce a depression that will form a microfeature on the polymeric article made using the mold insert.

Figure 2A:
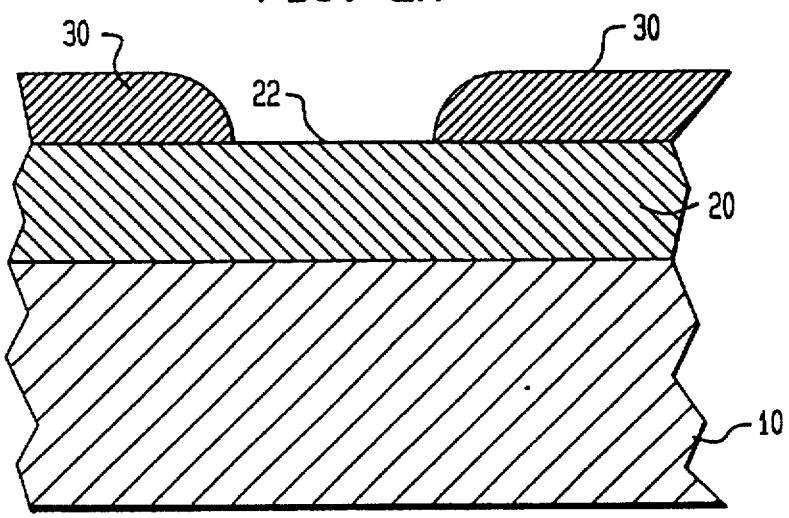
FIGS. 2A–C show schematic partial cross-sections of the structures made at various steps in a process of making a mold insert in accordance with this disclosure.
Figure 2B:
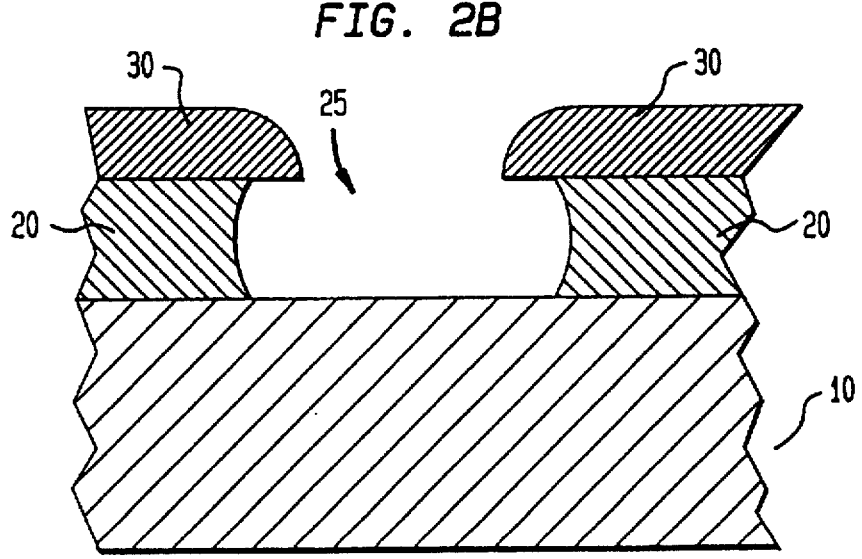

Etching of layer 20 is then performed to produce depression 25 as shown in FIG. 2B. Etching can be performed for example by dipping the structure shown in FIG. 2A into an etching solution with mild agitation. Suitable etching solutions are known for given materials. For example, where layer 20 is copper and substrate 10 is nickel, an alkaline etchant, such as a solution containing 2M cupric chloride ($CuCl_2$), 4.5M ammonium chloride ($NH_4Cl$) or 9M ammonium hydroxide ($N_4$ OH) can be used to etch layer 20 down to substrate 10, or down to a chromium barrier layer, if one is present. After etching is complete, masking layer 30 is stripped from layer 20 using known techniques, e.g., etching, to produce the final mold insert as shown in FIG. 2C.

Figure 2C:
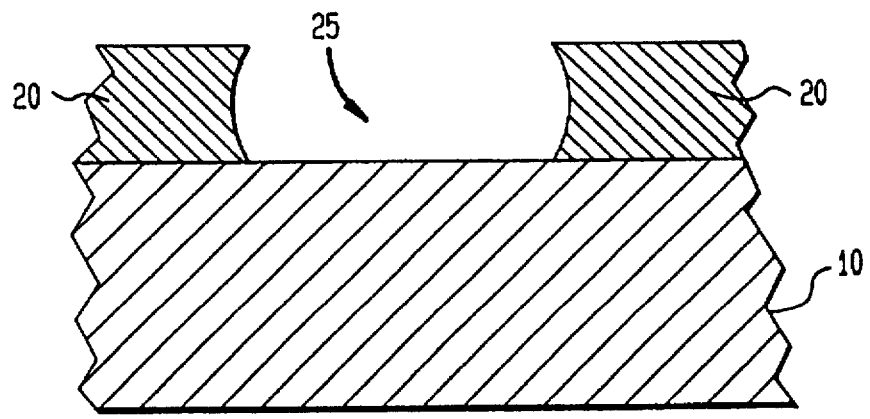

The mold insert of FIG. 2C is used in molding of polymeric articles. The mold insert is placed onto a mold (not shown) and polymeric resin in a fluid state (e.g., in solution, molten or uncured) is introduced onto the mold surface. The fluid resin flows into and fills depression 25. Upon hardening (e.g., evaporation of solvent, cooling or curing), a polymeric article is produced having a desired microfeature.

The term depression as used herein is intended to embrace the structure produced in a layer of material by removal of a portion of the material, e.g., by etching. The depressions can be of any configuration such as, for example, channels, cylindrical, spherical sections or combinations of these or other shapes. Resin flows into and preferably substantially fills the depressions on the mold insert. Upon hardening, the resin within the depressions define microfeatures on the polymeric article, the microfeature having a shape which corresponds to the internal shape of the depression. The depth of the depressions are precisely determined by the thickness of etchable layer 20. Any desired number of depressions can be provided on the mold insert by the processes disclosed herein. Thus, for example, a depression in the shape, of a linear channel will provide a linear ridge on the polymeric article. As another example, two adjacent depressions may define a ridge on the mild surface, thereby providing a channel on the polymeric article fabricated using the mold.

Suitable polymers for use in producing articles in accordance with this disclosure include thermoplastic resins such as polyolefins, polyesters, polycarbonates, polyurethanes, polyamides, polyethers, and copolymers and blends thereof. It is also contemplated that thermosetting polymers may be employed such as, for example, epoxies.

Figure 3A:
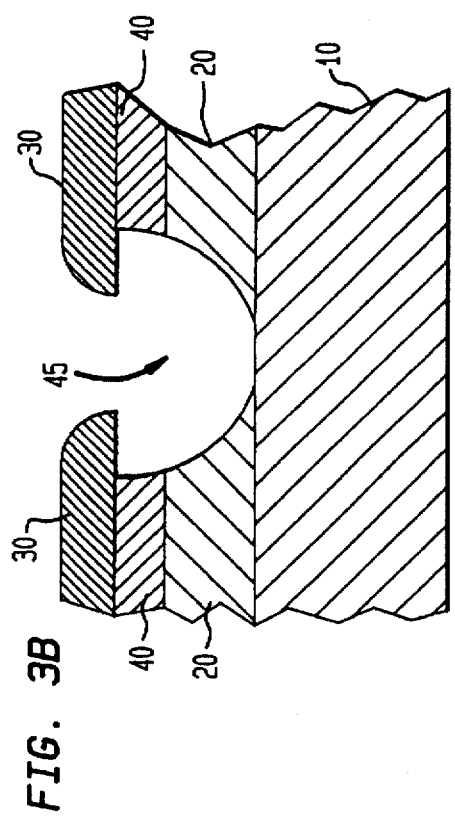
FIGS. 3A–D show schematic partial cross-sections of the structures made at various steps in another process of making a mold insert in accordance with this disclosure.

In another embodiment shown in FIG. 3A, two layers of etchable material 20, 40 are deposited on the substrate 10 prior to application of the masking layer 30.

Substrate 10 and layer 20 are formed as described above. Upper layer 40 is formed in the same manner as layer 20. The thickness of upper layer 40 can be from about 0.1 μm to about 20 m or greater. Preferably, the thickness of layer 40 is from about 0.01 to 1.0 times the thickness of layer 20. The relative thickness of layers 20 and 40 will effect the configuration of the depression in the mold surface formed by etching. The combined thickness of layers 20 and 40 is preferably from 1.0 to about 1.5 times the size of the microfeature to be produced.

A masking layer 30 is then applied to layer 40 using known photolithographic techniques. Masking layer 30 is applied in a predetermined pattern to provide one or more exposed portions 42 of layer 40 in appropriate locations and areas where microfeatures are desired on the polymeric article. Each exposed portion 42 of layer 40 will, upon etching, produce a depression that will form a microfeature on the polymeric article made using the mold insert.

Layer 40 can be made from a material which etches more quickly than the material from which layer 20 is made. Thus, for example, when layer 20 is copper, upper layer 40 can be titanium, aluminum, molybdenum or nickel. Due to the differential in etching rates between layers 40 and 20, tapered side walls are produced when the structure shown in FIG. 3A is etched.

Etching is performed as in the previous embodiment, for example by dipping into a solution of etchant. The precise composition of the etchant will depend upon the composition of the layers to be etched. Preferably, an etchant which etches layer 40 faster than it etches layer 20 is chosen. For example, where copper and titanium layers are employed in the structure of FIG. 3A, immersion for two minutes in a solution containing 81.6 grams of 49% HF, 9.8 g of 37% HCl and 85.2g of $CuCl_2.2H_2O$) per liter of solution, is suitable. Suitable etchants for other materials will be apparent to those skilled in the art.

Figure 3C:
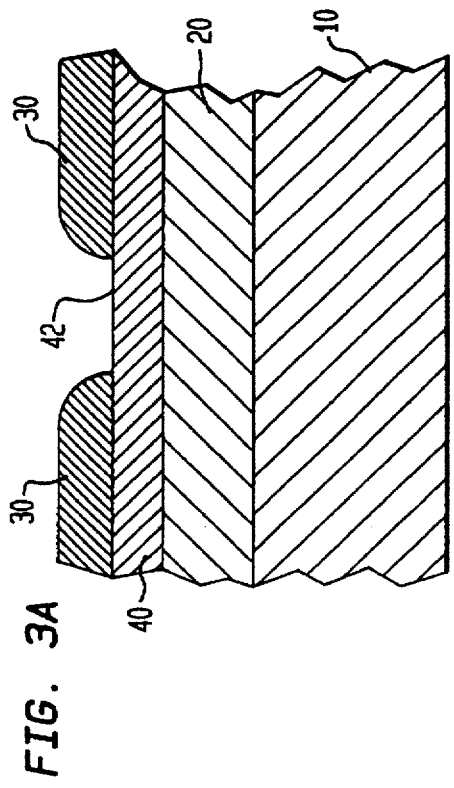
Figure 3B:
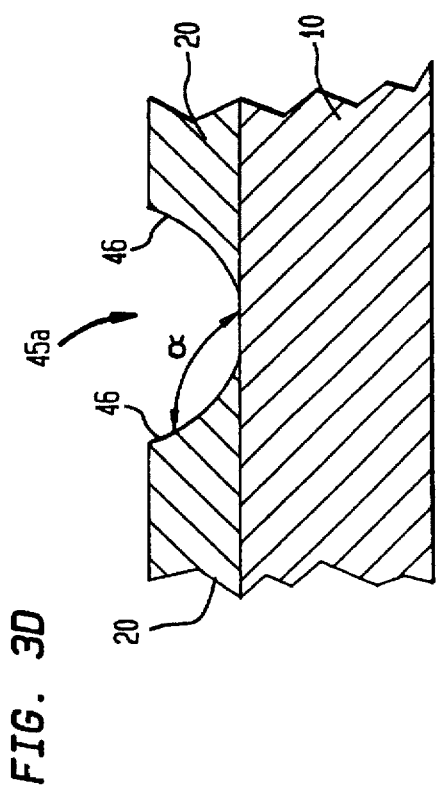

As seen in FIG. 3B, etching of layer 40 is more severe than etching of layer 20. A tapered depression 45 therefore is produced on the surface of the mold insert. Upon removal of masking layer 40, as shown in FIG. 3C, a mold insert suitable for use in molding polymeric articles is produced. Optionally, layer 40 can be removed, (e.g., by further, selective etching) prior to using the mold insert, providing tapered depression 45a of slightly lesser depth where layer 40 is made of titanium and layer 20 is made of copper, for example, etching in 0.5 % HF for around 30 seconds or until bubbling stops will strip off the titanium layer and leave a copper surface.

Figure 3D:
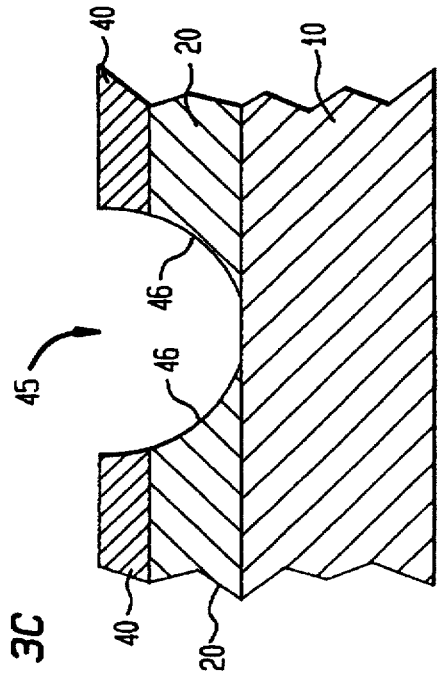
Figure 4A:
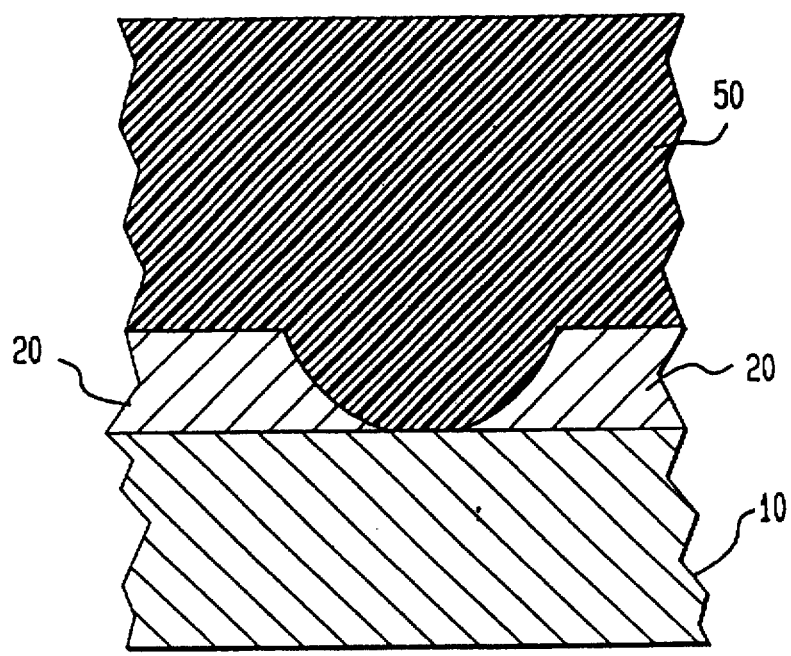
FIGS. 4A and B are schematic partial cross-sections of the steps of a molding process using the mold insert of FIG. 3D.
Figure 4B:
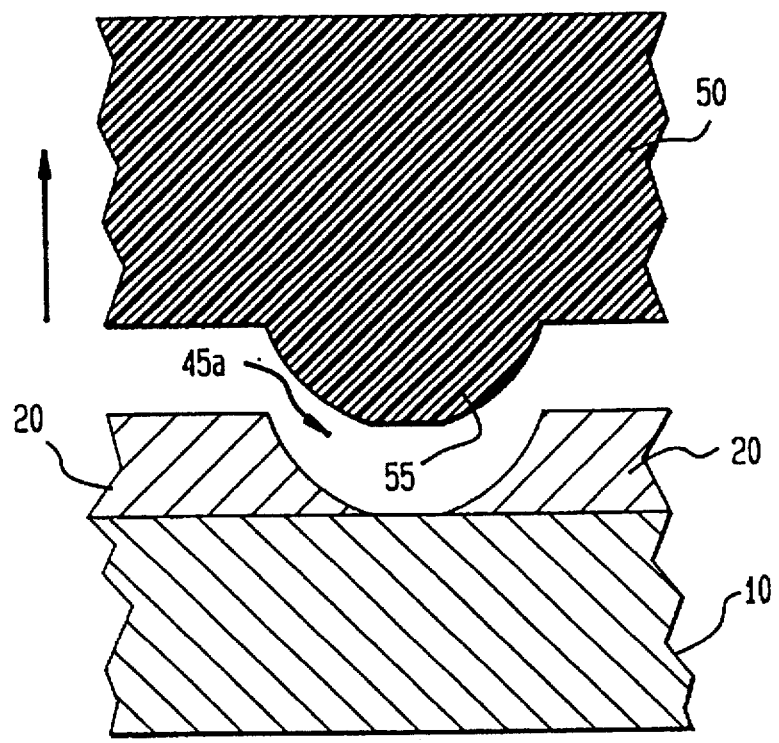

To fabricate polymeric articles having precision microfeatures, the mold insert, such as those shown in FIG. 2C, FIG. 3C or FIG. 3D, is placed onto and optionally secured to a platen (not shown) or other mold. A polymeric resin in fluid form is then contacted with the mold insert. For example, a polymer solution, molten thermoplastic resin or uncured thermosetting resin can be poured onto the surface of the mold insert. As shown in FIG. 4A, the resin 50 fills all voids and conforms to the surface of the mold insert. After hardening, e.g., (either through evaporation of solvent, cooling or curing) the resin 50 is removed from the mold as seen in FIG. 4B. The raised portion 55 of resin 50 which had filled tapered depression 45a now defines a microfeature on the polymeric article. The tapered side walls of depression 45a facilitate release of the molded polymeric article from the mold and mold insert.

The angle between the sidewalls 46 of tapered depression and the surface of substrate 10 can be adjusted by adjusting the composition of the etchant to adjust the relative etch rates of layers 20 and 40. A relatively high etch rate of layer 40 compared to the etch rate of layer 20 will give shallow side walls and a relatively low etch rate for layer 40 will give steeper side walls. In particularly useful embodiments, the angle (designated as α in FIG. 3D) between side walls 46 and the surface of substrate 10 is greater than about 120°, preferably between about 130° and 160°. Thus, for example, in the etchant used in connection with the structure of FIG. 3A, the angle between the side walls and the surface of the substrate can be made shallower by increasing the HF concentration and decreasing the $CuCl_2$ concentration.

Alternatively, the angle can be made steeper by increasing CuCl$_2$ concentration and decreasing the HF concentration in the etchant solution.

While any type of molded polymeric article can be provided with precision microfeatures using the processes disclosed herein, the present processes are particularly useful for preparing polymeric flat panel displays having precision microfeatures. Among the microfeatures which can be provided on a polymeric article using the techniques described herein are optical elements such as light scattering or diffusing elements and mechanical elements such as spacer bumps and ridges, liquid crystal filling dams, alignment fixtures and assembly frames. Other features which can be produced using the present methods will be envisioned by those skilled in the art.

It will be understood that various modifications may be made to the embodiments disclosed herein. For example, other metals and etchant systems may be employed such as, for example, the systems disclosed in U.S. Pat. No. 5,007,984, the disclosure of which is incorporated herein by reference. As another example, the various layers may be produced by other known techniques such as sputtering or plating. Additionally, the etching step may be carried out by showering the layers to be etched rather than dipping. It is also contemplated that by using a substrate of adequate thickness, a mold rather than a mold insert can be prepared in accordance with this disclosure. Therefore, the above description should not be construed as limiting, but merely as exemplifications of preferred embodiments. Those skilled in the art will envision other modifications within the scope and spirit of the claims appended hereto.

What is claimed is:

1. A device comprising:
   a flat panel display made from a polymeric resin and having an optically flat surface, the optically flat surface having at least one microfeature monolithically formed thereon, the microfeature having a height in the range of 0.1 µm to 50 µm.

2. A device as in claim 1, wherein the optically flat surface and microfeature are provided by contacting a mold with the polymeric resin in a fluid state.

3. A device as in claim 1 wherein the microfeature is selected from the group consisting of optical elements and mechanical elements.

4. A device as in claim 1 wherein the microfeature comprises a light scattering element.

5. A device as in claim 1 wherein the microfeature is selected from the group consisting of spacer bumps and ridges.

6. A device as in claim 1 wherein the microfeature comprises a liquid crystal filling dam.

7. A device as claim 1, wherein the microfeature comprises an alignment fixture.

8. A device as claim 1, wherein the microfeature comprises an assembly frame.

9. A device as claim 1, wherein the microfeature has at least one tapered side wall.

10. An electronic device comprising:
    a component made from a polymeric resin, the component having microfeatures monolithically formed thereon, the microfeatures having a height in the range of about 0.1 µm to about 50 µm.

11. A device as in claim 10, wherein the polymeric resin in a fluid state is a composition selected from the group consisting of solutions of polymers, molten thermoplastic polymers and uncured thermosetting polymers.

12. A mold for making a polymeric flat panel display, the mold comprising:
    an optically flat substrate for forming an optically flat portion of a flat panel display;
    a layer of etchable material applied to the optically flat substrate, the layer of etchable material having a thickness in the range of about 0.1 µm to about 50 µm and at least one depression formed therein, the interior of the depression corresponding in shape to a microfeature to be monolithically formed in the optically flat portion of the flat panel display.

13. A mold as in claim 12, wherein the interior of the depression corresponds in shape to a microfeature selected from the group consisting of optical elements and mechanical elements.

14. A mold as in claim 12, wherein the interior shape of the depression corresponds to a light scattering element.

15. A mold as in claim 12, wherein the interior shape of the depression corresponds to a microfeature selected from the group consisting of optical elements spacer bums, spacer ridges, liquid crystal filling dams, alignment fixtures and assembly frames.

16. A mold as in claim 12, wherein the depression has a tapered side wall.

17. A mold as in claim 12, wherein the optically flat substrate and etchable layer form a mold insert.

* * * * *